United States Patent [19]

Nakamura et al.

[11] Patent Number: 5,403,873

[45] Date of Patent: Apr. 4, 1995

[54] PLASTISOL FOR USE IN CONDUCTIVE MOLDED ARTICLE

[75] Inventors: Eitaro Nakamura, Tokyo; Kazunori Ueki, Yokohama, both of Japan

[73] Assignee: Nippon Zeon Co., Ltd., Tokyo, Japan

[21] Appl. No.: 16,258

[22] Filed: Feb. 11, 1993

[30] Foreign Application Priority Data

Feb. 18, 1992 [JP] Japan .................. 4-069205

[51] Int. Cl.$^6$ ............ C08K 9/10; H01B 1/12; B32B 15/08; B32B 27/14

[52] U.S. Cl. .................. 523/201; 523/205; 523/206; 523/207; 523/211; 252/500; 252/511; 428/407; 427/506; 427/520; 525/185; 525/186; 525/189; 525/210; 525/211; 525/902

[58] Field of Search ............... 428/407; 252/511, 500; 523/204, 205, 206, 207, 210, 211, 201, 209, 208; 427/485.5; 525/185, 186, 189, 210, 211, 902; 524/292, 296, 297, 298, 314

[56] References Cited

U.S. PATENT DOCUMENTS

| 2,761,854 | 5/1952 | Coler | 523/204 |
|---|---|---|---|
| 5,028,481 | 7/1991 | Stramel | 428/407 |
| 5,106,690 | 4/1992 | Stramel | 427/385.5 |
| 5,134,177 | 7/1992 | Aklonis et al. | 428/407 |
| 5,143,650 | 9/1992 | Gerace et al. | 252/511 |
| 5,215,820 | 6/1993 | Hosokawa et al. | 428/407 |
| 5,217,649 | 6/1993 | Kulkarni et al. | 252/500 |

FOREIGN PATENT DOCUMENTS

| 0215611 | 9/1986 | Japan | 523/206 |
|---|---|---|---|
| 0215612 | 9/1986 | Japan | 523/206 |
| 0151646 | 6/1990 | Japan | 252/511 |

*Primary Examiner*—Peter Szekely
*Attorney, Agent, or Firm*—Sherman and Shalloway

[57] ABSTRACT

There is provided a plastisol for use in a electrically conductive molded article comprising non-conductive high polymer particles having surfaces coated with an electrically conductive high polymer or non-conductive high polymer particles having surfaces coated with filler of electrically conductive fine particles, and a plastisizer compatible with the said non-conductive high polymer. The plastisol is excellent in fluidity and good in processability. Said plastisol can provide a molded article having excellent electrical conductivity and is suited for, e.g., production of floor materials or sealing materials having low static properties and formation of an electrically conductive path.

9 Claims, 2 Drawing Sheets (unit: mm)

PLASTISOL FOR USE IN CONDUCTIVE MOLDED ARTICLE

This invention relates to a novel plastisol for use in an electrically conductive molded article. More specifically, this invention relates to a plastisol which is excellent in fluidity and good in processability, and which gives a molded article having excellent electrical conductivity and is suited for production of floor materials or sealing materials having low static properties and formation of an electrically conductive path.

Processing of a plastisol has so far found wide acceptance in production of composite products of fibers and papers, such as floor materials, wall papers, sail fabrics, etc., production of sealing agents, packings, toys, etc. by making use of fluidity at normal temperatures. Certain of these products obtained by processing of the plastisol are required to have antistatic properties and electrical conductivity as performance characteristics. To meet the requirement, a method has been to date employed wherein the plastisol is blended with so-called electrically conductive powders, e.g., powders or finely divided products of carbonaceous materials such as carbon black, graphite and carbon short fibers powders of metals such as copper, silver, nickel and aluminum, powders of metallic compounds such as tin oxide and zinc sulfide, and glass powders having surfaces deposited with gold, nickel and silver.

In this method using these electrically conductive powders, however, a distance of the electrically conductive powders in the molded articles controls electrical conductivity. Accordingly, to raise electrical conductivity, the amounts of the electrically conductive powders have to be increased, making poor fluidity of the plastisol and decreasing processability. Besides, as the electrically conductive powders are incompatible with a resin component or a plasticizer used in the plastisol, mechanical strength of the molded articles is impaired. Meanwhile, to raise electrical conductivity with small amounts of the conductive powders, it has been known that a method is effective in which the electrically conductive powders are more finely divided or formed in a needle-like, plate-like, star-like or fibrous anisotropic shape. However, it is unescapable that said method decreases fluidity of the plastisol and impairs good processability which is a merit of the plastisol processing. Moreover, when the conductive powder has a particle size of more than several micrometers or is anisotropic, a glossy molded article can hardly be obtained.

This invention aims to remedy these defects associated with the conventional plastisol for use in a electrically conductive molded article and provide a plastisol that can give a conductive molded article without impairing fluidity of the plastisol and properties of the resulting molded article.

As a product that can achieve such an object, this invention provides a plastisol for use in an electrically conductive molded article comprising non-conductive high polymer particles having surfaces coated with an electrically conductive high polymer or non-conductive high polymer particles having surfaces coated with filler of conductive fine particles, and a plasticizer compatible with the nonconductive high polymer.

In the plastisol of this invention, the nonconductive high polymer particles having the surfaces coated with the electrically conductive high polymer or the nonconductive high polymer particles having the surfaces coated with the electrically conductive fine particles are used as a resin component. Examples of the nonconductive high polymer used as the base resin of the high polymer particles are resins for plastisol processing, such as a vinyl chloride resin, a methyl methacrylate resin and a polymethyl methacrylate-coated butadiene resin. Further, an ethylene resin, an ethylene rubber, an acrylate resin, an acrylate rubber, a diene resin, a styrene resin and a vinyl ester resin which have been so far deemed unsuitable for plastisol processing are also available if primary particles have a suitable particle size, e.g., 0.1 to 10 micrometers and a suitable shape, e.g., a spherical shape, as a plastisol.

The resins which have been hitherto unsuitable for plastisol processing are thus available as the base resin in this invention because the surfaces of the base resin particles are coated with the electrically conductive high polymer or the filler of the electrically conductive fine particles which are not dissolved or swelled with the plasticizer.

In this invention, examples of the electrically conductive high polymer that coats the surfaces of the nonconductive high polymer particles (base resin particles) are conjugated high polymers such as polyacetylene, polypyrrole, polyaniline, polythiophene, polyazulene and polyphenylene [see "Electron. Light Functional High Polymer", pp. 47–67, published by Kodansha Scientific, 1989].

Examples of a method for coating the electrically conductive high polymer on the surfaces of the base resin particles are a method in which a dispersion of the base resin particles is mixed with a monomer forming the electrically conductive high polymer to adhere or impregnate the monomer to or in the surfaces of the base resin particles, and a polymerization initiator is then added to conduct polymerization on the surfaces of the base resin particles, and a method in which the polymerization initiator is adhered to or impregnated in the surfaces of the base resin particles, and the monomer is then contacted with said particles to conduct polymerization on the surfaces of the base resin particles. Examples of the electrically conductive high polymer to which such a method can apply are many of heterocyclic electrically conductive high polymers, for example, pyrrole ring-containing compounds such as pyrrole, 3,4-dimethylpyrrole and 2,2'-thienylpyrrole, and polymers of thiophene homologues such as thiophene, 3-methylthiophene and 3-octylthiophene, polymers of aniline homologues such as aniline, o-toluidine and o-ethylaniline, and polyazulene. Examples of the polymerization initiator are oxidizing agents such as ferric chloride, potassium permanganate, potassium bichromate, hydrogen peroxide, organic peroxides and potassium persulfate.

Also available is a method in which a precursor of the electrically conductive high polymer is formed and adhered to the surfaces of the base resin particles, and the resulting product is then subjected to post treatment. Poly-p-phenylenevinylene can be coated by this method. A water-soluble electrically conductive high polymer such as polythiophene having an alkyl sulphonate residue or polyaniline can be coated by a method in which the polymer is added to an aqueous dispersion of the base resin particles and the resulting dispersion is spray-dried.

Further, if the base resin particles are a vinyl chloride resin, there is a special method in which a strong alkali is added to the aqueous dispersion thereof to dehydrochlorinate the surfaces of the particles for polyacetylenation.

Meanwhile, examples of the electrically conductive fine particles used to form the filler coatings on the surfaces of the base resin particles are the aforesaid electrically conductive high polymer powder, a metallic powder, a graphite powder, a carbon black powder, an oxide electrically conductive powder and a phthalocyanine powder. The electrically conductive fine particles are preferably those having a particle size which is one-tenth that of the base resin particles.

A method to form the electrically conductive filler coatings of the electrically conductive fine particles on the surfaces of the base resin particles can be a method in which the electrically conductive fine particles having much smaller a particle size (preferably one-tenth) than that of the base resin particles are previously mixed with the base resin particles and then fixed on the Surfaces by shock in a high-speed gas stream. It is also possible to coat the electrically conductive fine particles on the surfaces of the base resin particles by electroless plating treatment.

The thus obtained high polymer particles having the electrically conductive layers on the surfaces can be used in this invention if the size, the shape and the particle size distribution are within the ranges ordinarily used as the resin for plastisol processing. For example, particles containing primary particles of a spherical shape with a particle size of 0.1 to 10 microns and having a particle size distribution suited for plastisol processing are especially preferable. Resin particles which are mixed in amounts of 3 to 40% by weight based on the total weight of the resins to adjust viscosity are available if the particle size is about 10 to 100 micrometers.

Thickness of the coatings of the electrically conductive high polymer or the electrically conductive fine particles may be usually 10 Å or more. If the thickness is less than the above, electrical conductivity of the molded article is liable to be irregular. When the base resin particles are a resin such as the ethylene resin ordinarily considered unsuitable for plastisol processing, thickness of 100 Å or more is desirable to prevent migration of the plasticizer to the resin at normal temperatures. The maximum thickness of the electric-conductive coat is not particularly limited. It is, however, advisable from the aspects of properties of the molded article and economics that the maximum thickness is one-tenth or less of the particle size of the base resin particles.

In the plastisol of this invention, a liquid plasticizer compatible with the non-conductive high polymer as the base resin is used. The plasticizer is properly selected from those which are liquid at normal temperatures depending on the types of the base resin particles used. When the base resin is a vinyl chloride resin, examples of the plasticizer are phthalic acid derivatives such as dimethyl phthalate, diethyl phthalate, dibutyl phthalate, di-(2-ethylhexyl) phthalate, di-n-octyl phthalate, di-isobutyl phthalate, diheptyl phthalate, diphenyl phthalate, di-isodecyl phthalate, ditridecyl phthalate, diundecyl phthalate, di(heptyl, nonyl, undecyl) phthalate, benzyl phthalate, butylbenzyl phthalate, dinonyl phthalate and dicyclohexyl phthalate; isophthalic acid derivatives such as dimethyl isophthalate, di-(2-ethylhexyl) isophthalate and di-iso-octyl isophthalate; tetrahydrophthalic acid derivatives such as di-(2-ethylhexyl) tetrahydrophthalate, di-n-octyl tetrahydrophthalate and di-isodecyl tetrahydrophthalate; adipic acid derivatives such as di-n-butyl adipate, di-(2-ethylhexyl) adipate, di-isodecyl adipate and di-isononyl adipate; azelaic acid derivatives such as di-(2-ethylhexyl) azelate, di-iso-octyl azelate and di-n-hexyl azelate; sebacic acid derivatives such as di-n-butyl sebacate and di-(2-ethylhexyl) sebacate; maleic acid derivatives such as di-n-butyl maleate, dimethyl maleate, diethyl maleate and di-(2-ethylhexyl) maleate; fumaric acid derivatives such as di-n-butyl fumarate; trimellitic acid derivatives such as tri-(2-ethylhexyl) trimellitate, tri-n-octyl trimellitate, tri-isodecyl trimellitate, tri-iso-octyl trimellitate, tri-n-hexyl trimellitate and tri-isononyl trimellitate; pyromellitic acid derivatives such as tetra-(2-ethylhexyl) pyromellitate and tetra-n-octyl pyromellitate; citric acid derivatives such as triethyl citrate, tri-n-butyl citrate, acetyltriethyl citrate and acetyltri-(2-ethylhexyl) citrate; itaconic acid derivatives such as monomethyl itaconate, monobutyl itaconate, dimethyl itaconate, diethyl itaconate, dibutyl itaconate and di(2-ethylhexyl) itaconate; oleic acid derivatives such as butyl oleate, glyceryl monooleate and diethylene glycol monooleate; ricinoleic acid derivatives such as methylacetyl ricinoleate, butylacetyl ricinoleate, glyceryl monoricinoleate and diethylene glycol monoricinoleate; stearic acid derivatives such as n-butyl stearate, glycerol monostearate and diethylene glycol distearate; other aliphatic acid derivatives such as diethylene glycol monolaurate, diethylene glycol dipelargonate and pentaerythritol aliphatic acid ester; phosphoric acid derivatives such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate and tris(chlroethyl) phosphate; glycol derivatives such as diethylene glycol dibenzoate, dipropylene glycol dibenzoate, triethlene glycol dibenzoate, triethylene glycol di-(2-ethylibutylate), triethylene glycol di-(2-ethyl hexoate) and dibutylmethylene bisthioglycolate; glycerol derivatives such as glycerol stearate, glycerol triacetate and glycerol tributylate; epoxy derivatives such as epoxidized soybean oil, epoxybutyl stearate, di-2-ethylhexyl epoxyhexahydrophthalate, di-isodecyl epoxyhexahydrophthalate, epoxytriglyceride, epoxidized octyl oleate and epoxidized decyl oleate; and polyesters such as adipinic acrid polyester, sebacic acid polyester and phthalic acid polyester. When the base resin is a methyl methacrylate resin, plasticizers of relatively high polarity used for a vinyl chloride resin, such as dibutyl phthalate, butylbenzyl phthalate and tricresyl phosphate, are suitable. When a copolymerizable component is properly selected in a copolymer composed mainly of methyl methacrylate, the other plasticizers for a vinyl chloride resin are also available.

On the other hand, when the base resin is a diene rubber, an ethylene resin or an ethylene rubber, aromatic, naphthenic or paraffinic process oils can be used. Basically, a plasticizer having a solubility parameter close to the basic resin may be selected.

Moreover, the liquid epoxy resin can be used as a plasticizer.

The plastisol of this invention may contain, along with the non-conductive high polymer particles having the electrically conductive coatings on the surfaces and the liquid plasticizer, additives used so far in plastisol processing, for example, a heat stabilizer, a filler, a coloring agent, a light stabilizer, a viscosity modifier, a crosslinking agent, a blowing agent and a diluent if required. It is also possible to contain electrically conductive coating-free high polymer particles along with the non-conductive high polymer particles having the electrically conductive coatings on the surfaces. It is advisable that both the particles are of the same type, but the particles of different types are also available.

A process for producing the plastisol of this invention is not particularly limited and can be a method ordinarily used to produce the plastisol. On that occasion, a mixer usually employed to produce the plastisol can be adopted. Examples of such a mixer are a kneader, a Henschel mixer, a ribbon blender, a biaxial mixer, a butterfly mixer, a disper mixer, a Nauta mixer, a three-roll mill and a said mill. Further, after mixing the components, degassing treatment can also be conducted depending on usage.

In this manner, a plastisol for an electrically conductive molded article can be obtained which has excellent fluidity and good processability compared to the conventional plastisol. The reason for the plastisol of this invention to have excellent fluidity is presumably that since the electrically conductive material is fixed on the surface of the resin for the plastisol, the shape, the diameter and the particle size distribution of the resin particles for the plastisol designed to have excellent fluidity are retained in the plastisol. Moreover, the reason for good conductivity being provided despite very small an amount of the electrically conductive material is presumably that in the plastisol processing basically not accompanying pulverization or milling of resin particles, the electrically conductive materials fixed on the resin surfaces are contacted with each other during fusion of the resins impregnated with the plastisizer by heat gelation to form a conductive path.

In case electrically conductive material is a metallic film, the effect of this invention is not exhibited. The reason is presumably that migration of the plasticizer through the electrically conductive coating layers is hindered at the time of heating. For the same reason, the effect of this invention cannot be provided in case the base particles are a high polymer or a sort of glass incompatible with the plasticizer.

The following Production Examples, Examples and Comparative Examples illustrate this invention more specifically. However, this invention is not limited thereto.

In the attached drawings, FIGS. 1(a) and 1(b) are a side view and a plane view illustrating a method for measuring volume resistivity of a sheet obtained from a plastisol. In the drawings, 1 is a sample, 2 a silver paste electrode and 3 a measuring meter.

Figure 1A:
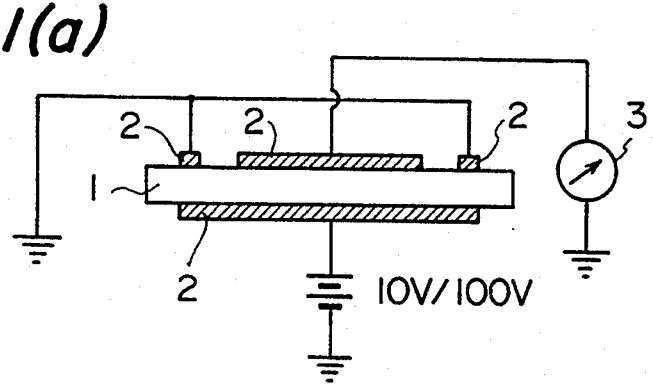
Figure 1B:
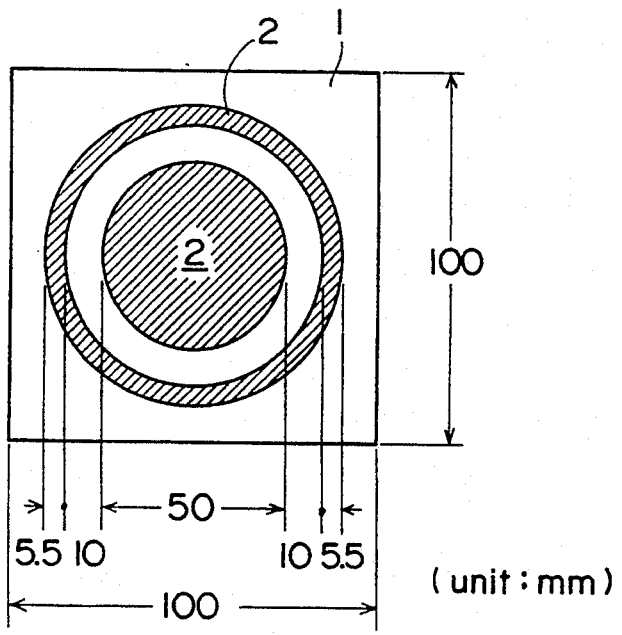

Methods for measuring properties are as follows.

(1) Viscosity of a plastisol:

A plastisol was charged into a 100 cc measuring container, left to stand at 23° C. for 6 hours, and then measured at 6 rpm with a B-type viscometer (Rotor #4) of Tokyo Keki K.K.

(2) Volume resistivity of a sheet:

A sheet Sample cut into a 100×100 mm square was measured. When volume resistivity was less than $10^8 \Omega \cdot cm$, the sample was measured at 23° C. with MCP-T-400 (a trademark for a machine of Mitsubishi Petrochemical Co., Ltd.). When volume resistivity is more than $10^8 \Omega \cdot cm$, electrodes 2 of silver pastes were formed on and under the sheet sample 1, and measurement was conducted with TR-43/TR-8601 (a trademark for a machine of Takeda Riken K.K.).

The plastisol and the sheet were prepared as follows.

(a) Preparation of the plastisol:

Components were mixed for 20 minutes with an Ishikawa milling machine, and defoaming was conducted at 20 mmHg for 30 minutes by a stirring type vacuum defoamer to prepare a plastisol.

(b) Preparation of the sheet:

The plastisol was coated on a 200×200×2 mm glass plate to a width of 100 mm and thickness of 0.5 mm via a doctor blade, then heated at 180° C. for 10 minutes with a hot air circulating oven, and cooled with air to prepare a sheet.

PRODUCTION EXAMPLE 1

Production of resin particles having electrically conductive high polymer coating An autoclave was charged with 250 parts by weight of an aqueous dispersion containing 40% by weight, as a solids content, of vinyl chloride resin particles (an average polymerization degree 1,100; an average particle size 1.3 micrometers) and a solution of 4 parts by weight of pyrrole in 15 parts by weight of a vinyl chloride monomer. After mixing them for 30 minutes, the vinyl chloride monomer was recovered in vacuo.

While 2,540 g of the thus obtained pyrrole-containing vinyl chloride resin aqueous dispersion, 272 milliliters of 1N hydrochloric acid and 356 g of a 0.1 wt. % ferric chloride hexahydrate aqueous solution were mixed in a 5-liter Erlenmeyer flask, 384 g of a 10 wt. % hydrogen peroxide aqueous solution was added dropwise thereto over a period of 2 hours. After the dropwise addition, mixing further continued for 8 hours. Subsequently, concentration and dilution were repeated by ultrafiltration to obtain a purified dispersion. By the way, the dilution Was conducted using a 0.5 wt. % aqueous solution of Gafac RE-610 (a trademark for a phosphoric acid ester-type surface active agent of GAF).

Subsequently, the purified dispersion was dried by a spray dryer to obtain dark gray polypyrrole coated vinyl chloride resin particles (A). Said particles were observed with an electron microscope and found to be completely coated With polypyrrole having thickness of about 0.02 micrometer.

PRODUCTION EXAMPLE 2

Production of resin particles having electrically conductive high polymer coating Production Example 1 was repeated except that aniline was used instead of pyrrole to obtain dark gray polyaniline coated vinyl chloride resin particles (B). Said particles (B) were coated with polyaniline having thickness of 0.02 micrometer like the particles (A).

PRODUCTION EXAMPLE 3

Production of resin particles having electrically conductive high polymer coating One part by weight of pyrrole was added to 100 parts by weight of a 40 wt. % aqueous dispersion of polymethyl methacrylate particles having an average particle size of 1.2 micrometers, and they were stirred for 1 hour. Subsequently, the mixture was mixed with 200 parts by weight of an aqueous solution containing 8.9 parts by weight of ferric chloride hexahydrate. The reaction mixture was left to stand overnight and the precipitate was collected by filtration. After said precipitate was washed with 1,000 parts by weight of distilled water, the obtained cake was dried at room temperature to obtain polypyrrole coated polymethyl methacrylate resin particles (C).

PRODUCTION EXAMPLE 4

Production of resin particles having electrically conductive high polymer coating Production Example 1 was repeated except that the vinyl chloride resin particles were replaced with blending resin particles (an average polymerization degree 1,000, an average particle size 42 micrometers) for plastisol processing and the amount of the 40 wt. % aqueous dispersion was changed into 1,000 parts by weight. There was obtained a slurry of black polypyrrole-coated resin particles. Subsequently, said particles were centrifugally dehydrated and dried to obtain resin particles (D). Observation of a section of the resin particles (D) reveals that the polypyrrole coating layer had thickness of about 0.03 micrometer.

PRODUCTION EXAMPLE 5

Production of resin particles having electrically conductive fine particle coating Two parts by weight of carbon black particles having an average particle size of 0.02 micrometer were surface-adhered to 100 parts by weight of blending vinyl chloride resin particles for plastisol processing (an average polymerization degree 1,000, an average particle size 42 micrometers) by premixing, and embedded in the surfaces with a hybridizer of Nara Kikai Seizo K.K. to obtain resin particles (E) having carbon black coating. The resin particles (E), even when rubbed on a white paper, contaminated a white paper only slightly, meaning that said particles little contained free carbon. Observation of said particles with an electron microscope reveals that carbon black was uniformly adhered to and fixed on the surfaces of the resin particles. The resin particles (E) had an average particle size of 36 micrometers and were nearly spherical, while the untreated resin particles were somewhat flat.

PRODUCTION EXAMPLE 6

Production of a mixed resin containing electrically conductive high polymer particles According to a method of Armes, et al. ["J. Colloid Interface Sci", vol 118, p. 410, 1987], an aqueous dispersion of polypyrrole particles having a particle size of 0.14 micrometer was formed and purified by ultrafiltration. This dispersion and the aqueous dispersion of the vinyl chloride resin particles used to produce the resin particles (A) were mixed such that the ratio of the polypyrrole and the vinyl chloride resin was the same as in the resin particles (A), and further spray-dried to obtain pyrrole particle-containing mixed resin particles (F).

EXAMPLE 1 x-Parts by weight of the resin particles (A), 100-x parts by weight of "Zeon 121" [a trademark for a vinyl chloride resin for plastisol of Nippon Zeon Co., Ltd., an average polymerization degree 1,600], 60 parts by weight of DOP (dioctyl phthalate) and 1 part by weight of "KS-21" [a trademark for dibutyltin laurate of Kyodo Yakuhin K.K.] were mixed to obtain 6 types of plastisols wherein x were 100, 50, 25, 12, 6 and 0 part by weight. The six plastisols were measured for viscosity and volume resistivity. The results are graphically represented in FIG. 2.

Figure 2:
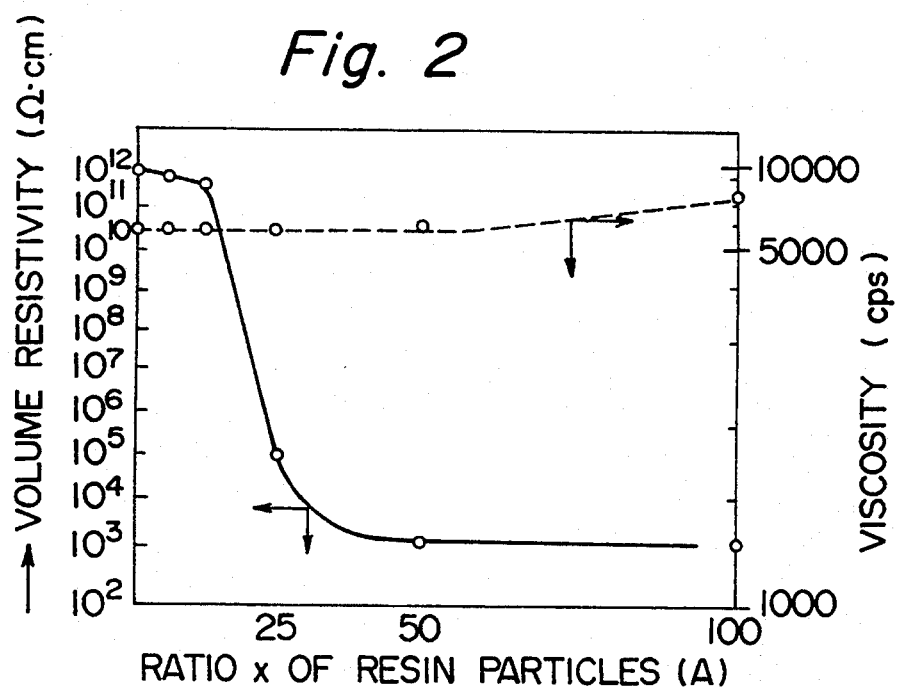
FIG. 2 is a graph representing a relation of a ratio of resin particles (A), viscosity of a plastisol and volume resistivity of a sheet in Example 1.

From FIG. 2, it follows that the resin particles (A) alone can give the plastisol having low viscosity and good fluidity, form a sheet having high electrical conductivity and maintain high electrical conductivity even if considerable amounts of the usual resin particles for plastisol are used.

Figure 3:
FIG. 3 is a photograph of the particles.

Then, using the plastisol with x=50 parts by weight, a sheet was formed in accordance with the recipe described in "Preparation of the sheet". Said sheet was frozen at −100° C. with liquid nitrogen, and sliced to a width of 0.1 micrometer with a microtome to form a sample for observation width an electron microscope. Said sample was observed 20,000 X with a transmission-type electron microscope and photographed. The photo was further enlarged twice to obtain a 40,000 X enlarged photo shown in FIG. 3. According to FIG. 3, the circumferential portion of the cross-section of the particle was trimmed in black, which proved presence of a conductive coating.

COMPARATIVE EXAMPLE 1

Three types of plastisols were prepared as in Example 1 except that carbon black ["Mitsubishi Carbon/3250": a trademark for a product of Mitsubishi Chemical Industries, Ltd., a specific surface area 240 m$^2$/g, an amount of an absorbed oil 80 ml/g] was used instead of the resin particles (A) and x was 1, 2 and 3 parts by weight. Said plastisols were measured for viscosity and volume resistivity. By the way, carbon black was used in the form of a toner obtained by dispersing 10 parts by weight of carbon black in 90 parts by weight of DOP with a three-roll mill.

The results are shown in Table 1. For comparison, the data of the plastisol with x=25 parts by weight in Example 1 are also shown in Table 1.

TABLE 1

|  | Comparative Example 1 | | | Example 1 |
| --- | --- | --- | --- | --- |
| X (parts by weight) | 1 | 2 | 3 | 25 |
| Amount of a conductive material (parts by weight) | 1 | 2 | 3 | 1 |
| Viscosity (cps) | 14,000 | 78,000 | >100,000 | 6,400 |
| Volume resistivity (Ω.cm) | 2 × 10$^{12}$ | 1.2 × 10$^{12}$ | 2 × 10$^8$ | 2 × 10$^5$ |

From Table 1, it becomes apparent that the plastisol of this invention has low viscosity, provides a molded article having good electrical conductivity and gives high electrical conductivity even with the small amount of the electrically conductive material.

EXAMPLES 2 to 7 and COMPARATIVE EXAMPLES 2 to 4

Plastisols were prepared according to the formulation shown in Table 2 and measured for viscosity and volume resistivity. The results are shown in Table 2.

TABLE 2

| | Example 2 | Example 3 | Example 4 | Example 5 | Example 6 | C. Ex. 2 | C. Ex. 3 | Example 7 | C. Ex. 2 |
|---|---|---|---|---|---|---|---|---|---|
| Amounts (parts by weight) | | | | | | | | | |
| Resin particle (A) | 70 | — | 70 | 70 | 15 | — | — | — | — |
| Resin particle (B) | — | 70 | — | — | — | — | — | — | — |
| Resin particle (C) | — | — | — | — | — | — | — | 100 | 100 |
| Resin particle (D) | 30 | 30 | — | — | — | — | — | — | — |
| Resin particle (E) | — | — | 30 | — | — | — | — | — | — |
| Resin particle (F) | — | — | — | — | — | 70 | — | — | — |
| Zeon Resin 121[1)] | — | — | — | — | 55 | — | 70 | — | — |
| Zeon Resin 103ZXA[2)] | — | — | — | 30 | 30 | 30 | 30 | — | — |
| Dioctyl phthalate | 60 | 60 | 60 | 60 | 60 | 60 | 60 | — | 80 |
| Tricresyl phosphate | — | — | — | — | — | — | — | 80 | — |
| Whiton SB[3)] | 30 | 30 | 30 | 30 | 30 | 30 | 30 | 30 | 30 |
| Mark SC-34[4)] | 2 | 2 | 2 | 2 | 2 | 2 | 2 | — | — |
| Properties | | | | | | | | | |
| Viscosity (cps) | 5400 | 6000 | 6900 | 5000 | 4900 | 9800 | 4600 | 12000 | 8000 |
| Volume resistivity (Ω.cm) | $1.3 \times 10^3$ | $0.9 \times 10^3$ | $1.1 \times 10^3$ | $1.3 \times 10^3$ | $5 \times 10^5$ | $6 \times 10^{11}$ | $9 \times 10^{11}$ | $0.7 \times 10^3$ | * |

C. Ex.: Comparative Example

NOTES

1) As noted above.
2) Plastisol blending vinyl chloride resin of Nippon Zeon Co., Ltd., an average polymerization degree 1,000.
3) Heavy calcium carbonate of Shiraishi Calcium K.K.
4) Calcium zinc stabilizer of Asahi Denka K.K.
* Not determined since no film could be formed by heating and the sheet was brittle due to intensive bleeding out of the plasticizer.

Table 2 reveals that the plastisol of this invention has low viscosity and provides the molded article having high electrical conductivity. It is further found that when using the mixed resin particles containing the electrically conductive high polymer particles (Comparative Example 2) and the plasticizer incompatible with the base resin (Comparative Example 4), the effects of this invention are not brought forth.

As has been stated above, the plastisol for use in the electrically conductive molded article containing the resin particles having the coating layers of the electrically conductive high polymer or the conductive fine particles on the surfaces as the resin component in this invention has excellent fluidity and good processability and can provide the molded article having excellent electrical conductivity, so that said plastisol can suitably be used for production of floor materials or sealing materials having low static properties and formation of an electrically conductive path.

What we claim is:

1. A plastisol for use in an electrically conductive molded article comprising non-conductive high polymer particles having surfaces coated with an electrically conductive high polymer, and a plasticizer compatible with the said non-conductive high polymer.

2. The plastisol of claim 1 wherein said non-conductive high polymer particles having surfaces coated with an electrically conductive high polymer are prepared by a process which comprises adhering or impregnating one or more monomers selected from the group consisting of a pyrrole ring-containing compound, a thiophene homolog, an aniline homolog and azulene to or in surfaces of non-conductive high polymer particles containing primary particles of a spherical shape with a particle size of 0.1 to 10 micrometers, and then adding a polymerization initiator to conduct polymerization on the surfaces of the particles, or adhering or impregnating the polymerization initiator to or in the surfaces of the polymer particles, and then contacting the particles with the monomer to conduct polymerization on the surface of the particles.

3. The plastisol of claim 2 wherein said non-conductive high polymer particles are particles of a resin selected from the group consisting of vinyl chloride resin, methyl methacrylate resin and polymethyl methacrylate-coated butadiene resin.

4. The plastisol of claim 2 wherein said non-conductive high polymer particles are vinyl chloride resin particles.

5. The plastisol of claim 2 wherein said non-conductive high polymer particles are methyl methacrylate resin particles.

6. The plastisol of claim 2 wherein said polymerization initiator is a compound selected from the group consisting of ferric chloride, potassium permanganate, potassium bichromate, hydrogen peroxide, organic peroxides and potassium persulfate.

7. The plastisol of claim 2 wherein said polymerization initiator is ferric chloride and optionally hydrogen peroxide.

8. The plastisol of claim 2 wherein viscosity adjusting resin particles which have a particle size of about 10 to 100 micrometers are further contained in an amount of 3 to 40% by weight based on the total weight of the resin.

9. The plastisol of claim 2 wherein the thickness of the coating of said electrically conductive high polymer is 10Å or more, and one-tenth or less of the particle size of said nonconductive high polymer particles.

* * * * *